(12) United States Patent
Cho et al.

(10) Patent No.: US 11,003,138 B2
(45) Date of Patent: May 11, 2021

(54) DISPLAY DEVICE

(71) Applicant: Samsung Display Co., Ltd., Yongin-si (KR)

(72) Inventors: Jonghwan Cho, Ansan-si (KR); Hangyeol Kim, Hwaseong-si (KR); Hyunseung Seo, Anyang-si (KR); Daeho Yoon, Hanam-si (KR); Jaehoon Jung, Bucheon-si (KR)

(73) Assignee: Samsung Display Co., Ltd., Yongin-si (KR)

(*) Notice: Subject to any disclaimer, the term of this patent is extended or adjusted under 35 U.S.C. 154(b) by 231 days.

(21) Appl. No.: 15/616,010

(22) Filed: Jun. 7, 2017

(65) Prior Publication Data
US 2017/0364029 A1 Dec. 21, 2017

(30) Foreign Application Priority Data

Jun. 15, 2016 (KR) .................. 10-2016-0074680

(51) Int. Cl.
| | | |
|---|---|---|
| *G03H 1/26* | (2006.01) | |
| *G02F 1/1333* | (2006.01) | |
| *G02B 1/14* | (2015.01) | |
| *G09F 19/02* | (2006.01) | |
| *G09F 19/12* | (2006.01) | |

(52) U.S. Cl.
CPC .............. *G03H 1/265* (2013.01); *G02B 1/14* (2015.01); *G02F 1/133305* (2013.01); *G09F 19/02* (2013.01); *G09F 19/12* (2013.01); *G02F 2201/50* (2013.01)

(58) Field of Classification Search
CPC . G02B 1/14; G02F 1/133305; G02F 2201/50; G09F 19/02; G09F 19/12; G03H 1/265
See application file for complete search history.

(56) References Cited

U.S. PATENT DOCUMENTS

| | | | | |
|---|---|---|---|---|
| 3,785,861 A | * | 1/1974 | Tanimura | C08J 7/0427 |
| | | | | 428/336 |
| 6,166,855 A | * | 12/2000 | Ikeyama | G02B 1/11 |
| | | | | 359/580 |
| 8,580,027 B1 | * | 11/2013 | Campos | C08K 9/08 |
| | | | | 106/287.27 |
| 2013/0130002 A1 | | 5/2013 | Lee et al. | |

(Continued)

FOREIGN PATENT DOCUMENTS

| | | |
|---|---|---|
| CN | 202864024 | 4/2013 |
| CN | 202965319 | 6/2013 |

(Continued)

OTHER PUBLICATIONS

Machine translation of JP 5769625 B2, in the same patent family as WO 2011/013798 A1 (Year: 2015).*

*Primary Examiner* — Ramsey Zacharia
(74) *Attorney, Agent, or Firm* — H.C. Park & Associates, PLC

(57) ABSTRACT

A display device includes a display panel and a window member provided on the display panel. The window member includes a plastic window, a first hard coating layer provided on the plastic window, and a second hard coating layer provided on the first hard coating layer. A surface water contact angle of the second hard coating layer may be in a range of 90 degrees to 117 degrees.

8 Claims, 14 Drawing Sheets

(56) References Cited

U.S. PATENT DOCUMENTS

2014/0335337 A1   11/2014  Lee et al.
2017/0098794 A1    4/2017  Cho et al.

FOREIGN PATENT DOCUMENTS

| | | | |
|---|---|---|---|
| CN | 204845045 | 12/2015 | |
| JP | 2013068693 | 4/2013 | |
| JP | 5237506 | 7/2013 | |
| JP | 5468167 | 4/2014 | |
| JP | 5870223 | 2/2016 | |
| JP | 5882496 | 3/2016 | |
| KR | 10-1058395 | 8/2011 | |
| KR | 10-2013-0003339 | 1/2013 | |
| KR | 10-2013-0013881 | 2/2013 | |
| KR | 10-2013-0055311 | 5/2013 | |
| KR | 10-2017-0040433 | 4/2014 | |
| KR | 10-2016-0002593 | 1/2016 | |
| WO | WO-2011013798 A1 * | 2/2011 | ............. G02B 1/105 |

* cited by examiner

DISPLAY DEVICE

CROSS-REFERENCE TO RELATED APPLICATION

This application claims priority from and the benefit of Korean Patent Application No. 10-2016-0074680, filed on Jun. 15, 2016, which is hereby incorporated by reference for all purposes as if fully set forth herein.

BACKGROUND

Field

Exemplary embodiments relate to a display device and, more particularly, to a display device having a slim profile and improved durability.

Discussion of the Background

Generally, glass has been used as a window member for protecting a display panel in a display device. In addition, tempered glass is used as a window member for protecting a surface of a display device of a mobile terminal, such as a smart phone or a tablet personal computer (tablet PC). However, the glass and the tempered glass may be broken by an external impact, and may be difficult to apply to a flexible display device. Thus, window members formed of plastic materials are currently being studied.

The plastic materials may be used in place of glass because of their light weight, high impact resistance, and transparent characteristics. There is an increasing tendency to form the window members by using plastic materials having excellent characteristics, such as excellent weather resistance, scratch resistance, impact resistance, and workability. The window members formed of the plastic materials may permit slimmer profiles for display devices and may increase surface hardness, impact resistance, and improve workability of the display devices.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device having a slim profile and improved durability.

Additional aspects will be set forth in the detailed description which follows, and, in part, will be apparent from the disclosure, or may be learned by practice of the inventive concept.

An exemplary embodiment discloses a display device including a display panel and a window member provided on the display panel. The window member includes a plastic window, a first hard coating layer provided on the plastic window, and a second hard coating layer provided on the first hard coating layer. A surface water contact angle of the second hard coating layer may be in a range of 90 degrees to 117 degrees.

The plastic window may have a pencil hardness of B to 3H.

The first hard coating layer may have a pencil hardness of 3H to 8H.

The second hard coating layer may have a pencil hardness of 3H to 9H.

The first hard coating layer may include a first sub-hard coating layer and a second sub-hard coating layer provided on the first sub-hard coating layer.

The second hard coating layer may have an anti-fingerprint property.

The second hard coating layer may include a hard coating compound. The hard coating compound may include an anti-fingerprint portion disposed at a surface of the second hard coating layer, and a hard coating portion connected to the anti-fingerprint portion.

The anti-fingerprint portion may include fluorine or silicon.

A weight of the hard coating portion may be greater than a weight of the anti-fingerprint portion.

The second hard coating layer may include a hard coating layer and an anti-fingerprint layer provided on the hard coating layer. The hard coating layer may be formed of the hard coating portion, and the anti-fingerprint layer may be formed of the anti-fingerprint portion.

The display device may further include a third hard coating layer provided under the plastic window.

The third hard coating layer may have a pencil hardness of H to 3H.

The window member may be flat.

The window member may be bent.

The display device may be selected from a group consisting of a portable phone, a television, a computer, a wearable display device, a rollable display device, a foldable display device, an automotive display device, and a decorative display device.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1A:
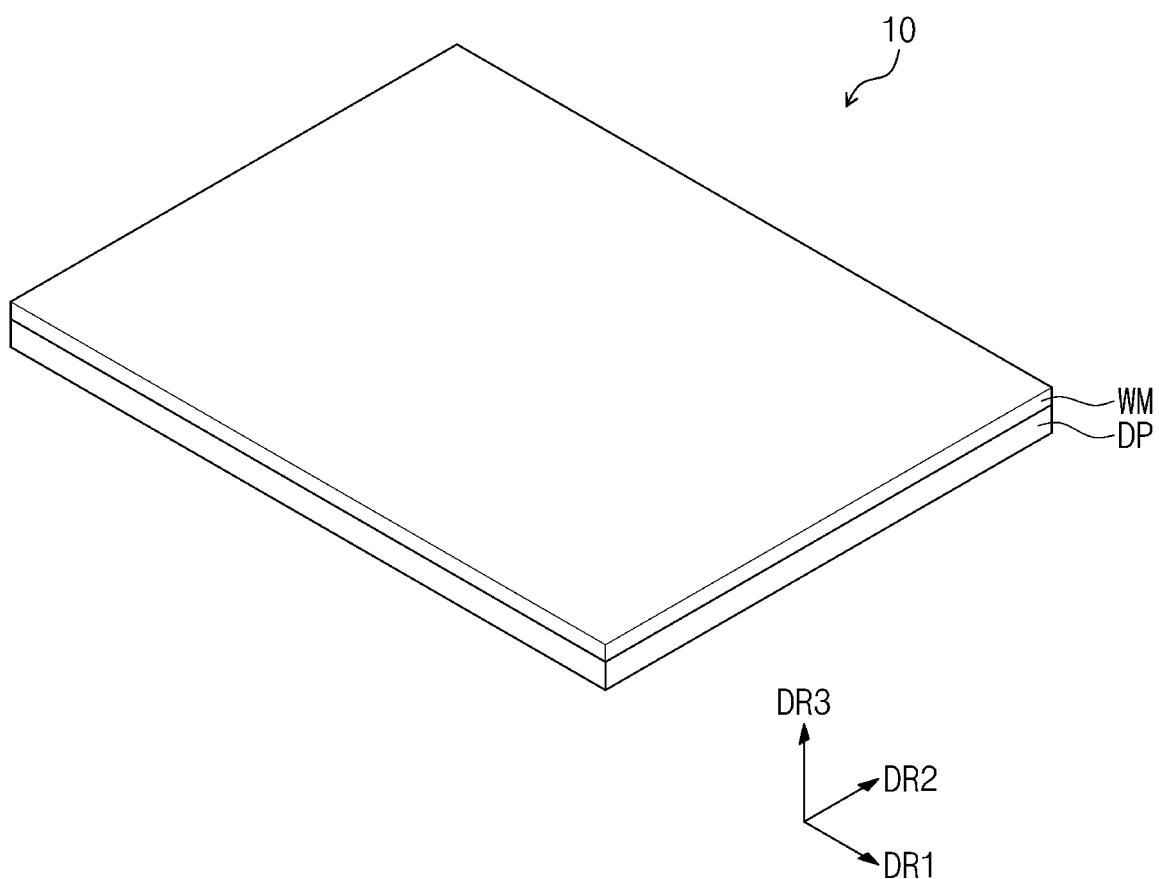
FIG. 1A and FIG. 1B are perspective views schematically illustrating display devices according to an exemplary embodiment of the inventive concepts.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1B:
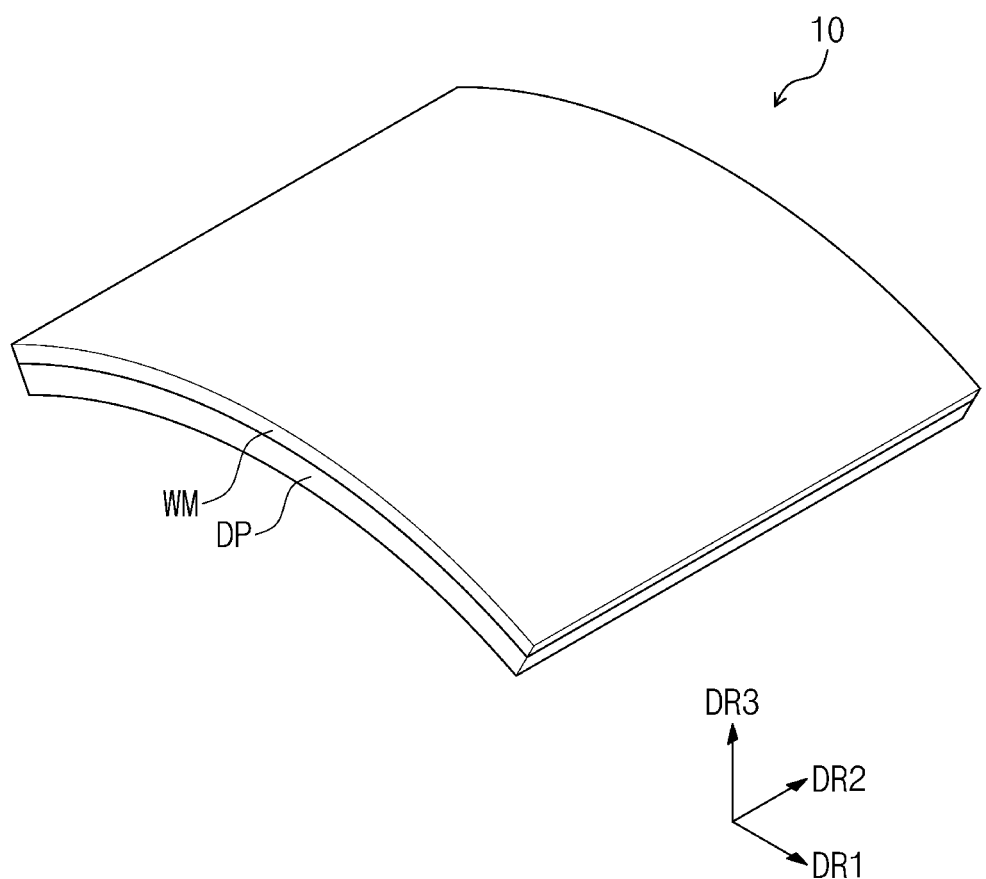
Figure 1C:
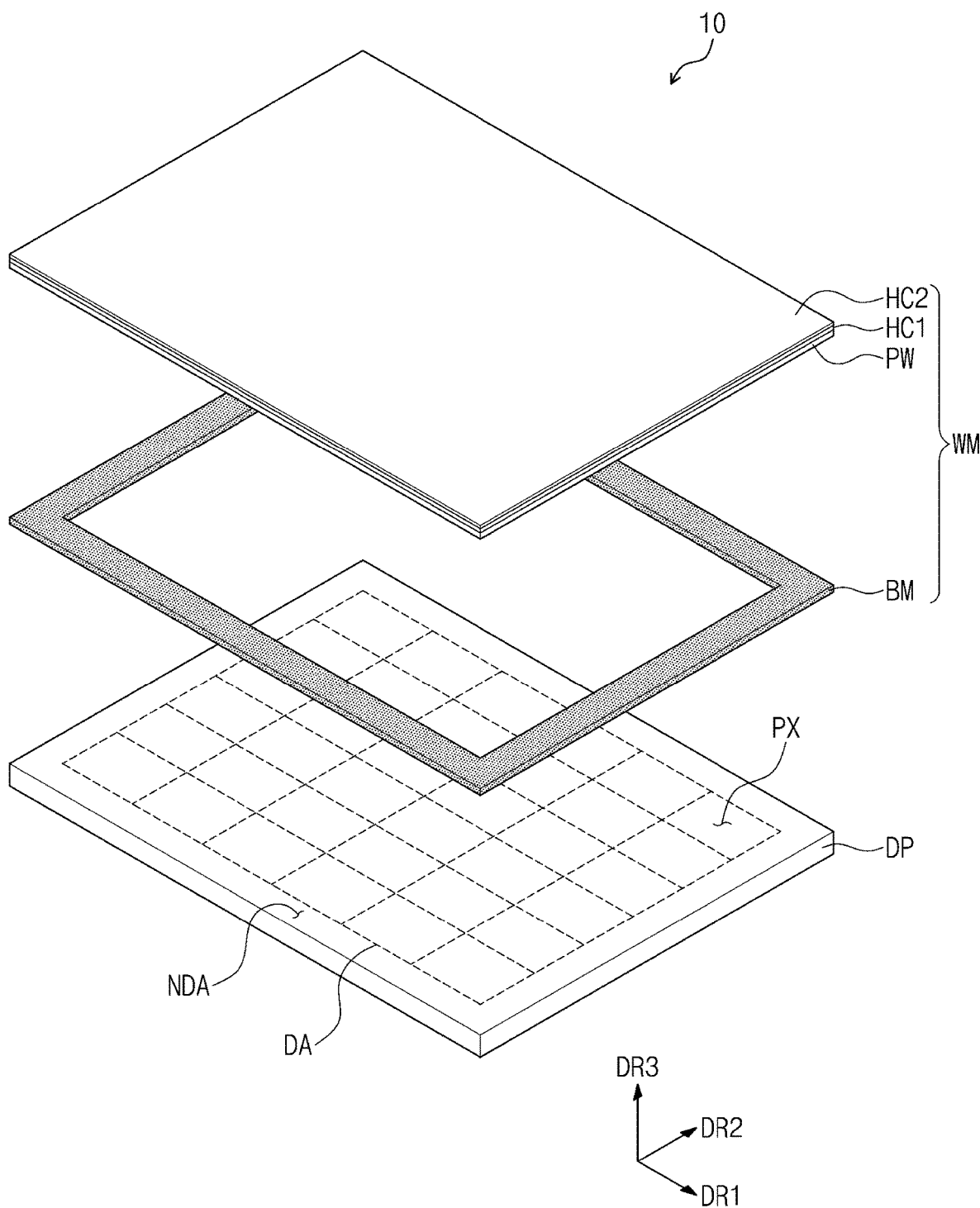
FIG. 1C is an exploded perspective view schematically illustrating a display device according to an exemplary embodiment of the inventive concepts.
Figure 2A:
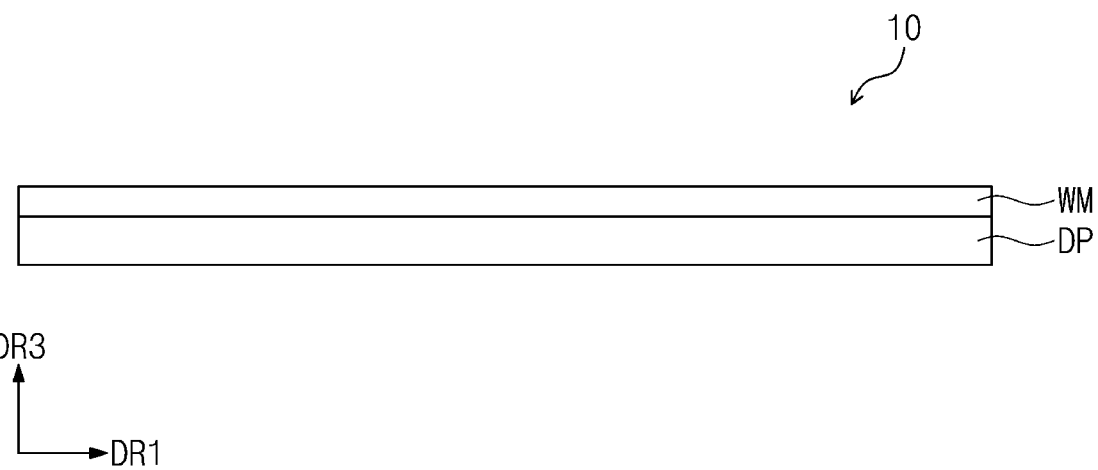
FIG. 2A and FIG. 2B are cross-sectional views schematically illustrating display devices according to an exemplary embodiment of the inventive concepts.
Figure 2B:
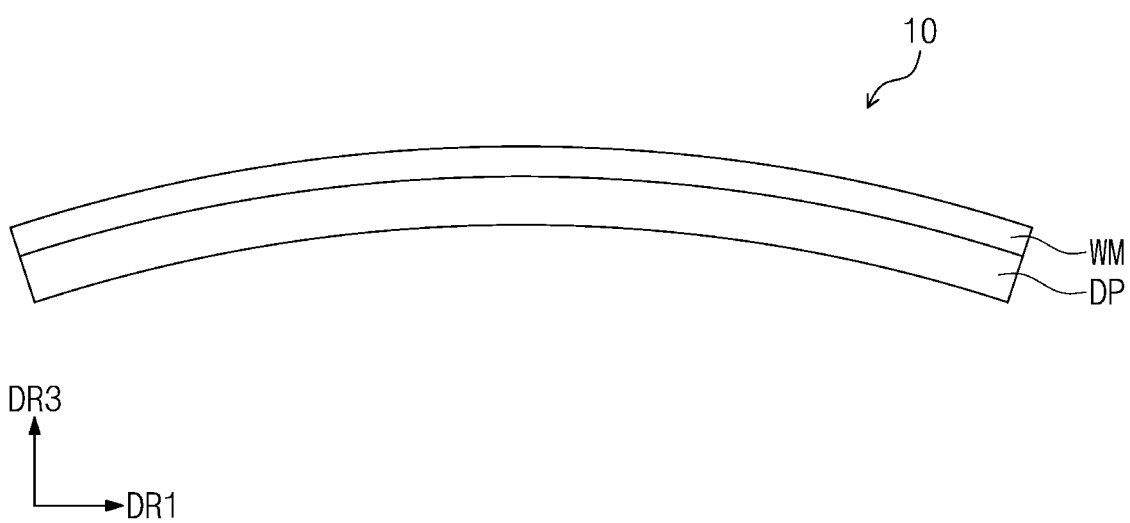

FIGS. 1A and 1B are perspective views schematically illustrating display devices according to an exemplary embodiment of the inventive concepts. FIG. 1C is an exploded perspective view schematically illustrating a display device according to an exemplary embodiment of the inventive concepts. FIGS. 2A and 2B are cross-sectional views schematically illustrating a display device according to an exemplary embodiment of the inventive concepts.

Referring to FIGS. 1A, 1B, 1C, 2A, and 2B, a display device 10 according to an exemplary embodiment of the inventive concepts includes a display panel DP and a window member WM. The display panel DP displays an image. The display panel DP is not limited to a specific display panel as long as the display panel DP displays the image. For example, the display panel DP may be an organic light emitting display panel, a liquid crystal display panel, a plasma display panel, an electrophoretic display panel, a microelectromechanical (MEMS) system display panel, or an electrowetting display panel.

The display panel DP may be flat, as illustrated in FIG. 2A. Alternatively, the display panel DP may be bent, as illustrated in FIG. 2B. The term "bent" or "bending" may mean that the display panel DP is bent to have a specific shape by an external force. A bending degree of the display panel DP may range from several nanometers to a visible size. The term "bent" or "bending" may mean that an element or component is curved, foldable, stretchable, and/or rollable.

The display panel DP may be rigid in a bent state or may be flexible. The term "flexible" may mean a bendable or foldable characteristic and may range from a completely folded structure to a structure bendable or foldable by several nanometers.

The display panel DP is divided into a display area DA and a non-display area NDA. The display area DA displays the image. The Display area DA may have, but not limited to, a substantially rectangular shape when viewed from a plan view. A plurality of pixels PX may be disposed in the display area DA. Each of the pixels PX may be the minimum unit forming the image.

The non-display area NDA does not display the image. For example, the non-display area NDA may surround the display area DA in a plan view. The non-display area NDA may be adjacent to the display area DA in a first direction DR1 and a second direction DR2.

Referring again to FIGS. 1A, 1B, 1C, 2A, and 2B, the window member WM is provided on the display panel DP. The window member WM may be stacked on the display panel DP in a third direction DR3. The image provided from the display panel DP may be transmitted through the window member WM so as to be shown to a user. The window member WM may be flat, as illustrated in FIG. 2A. Alternatively, the window member WM may be bent, as illustrated in FIG. 2B. A bending degree of the window member WM may range from several nanometers to a visible size. The window member WM may be rigid in a bent state or may be flexible. The window member WM includes a plastic window PW, a first hard coating layer HC1, and a second hard coating layer HC2.

The window member WM may further include a black matrix BM. The black matrix BM may shield or block light except the image provided from the display panel DP or external light. The black matrix BM may be provided under the plastic window PW. Even though not shown in the drawings, the black matrix BM may be provided under a third hard coating layer HC3 of FIG. 3C to be described later.

The black matrix BM may overlap with the non-display area NDA of the display panel DP when viewed from a plan view. The black matrix BM may not overlap with the display area DA of the display panel DP when viewed from a plan view. The window member WM will be described below in more detail.

FIGS. 3A, 3B, 3C, 3D, 3E, and 3F are cross-sectional views schematically illustrating various examples of the window member WM included in the display device 10 according to an exemplary embodiment of the inventive concepts.

Figure 3A:
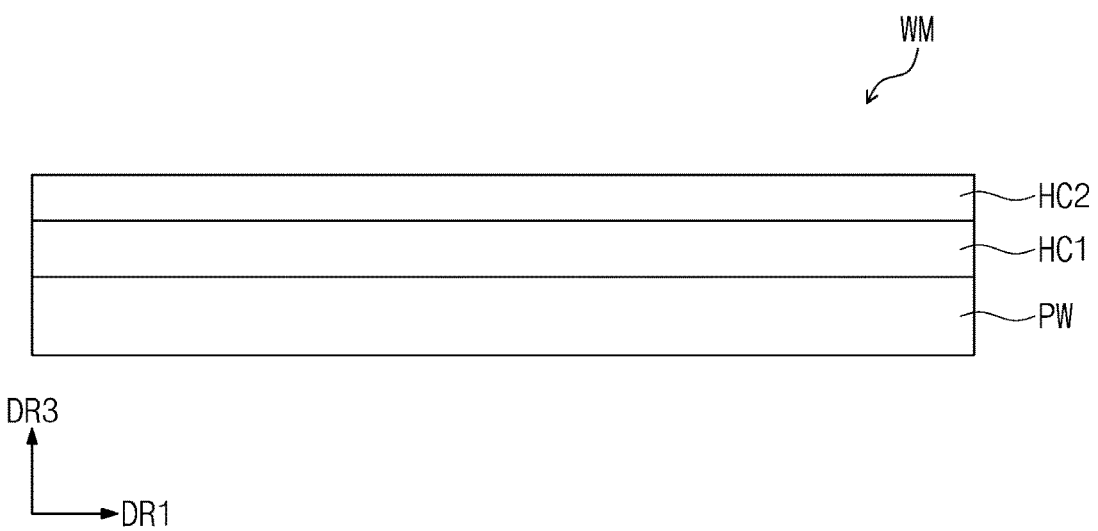
FIG. 3A, FIG. 3B, FIG. 3C, FIG. 3D, FIG. 3E, and FIG. 3F are cross-sectional views schematically illustrating a window member included in a display device according to an exemplary embodiment of the inventive concepts.
Figure 3B:
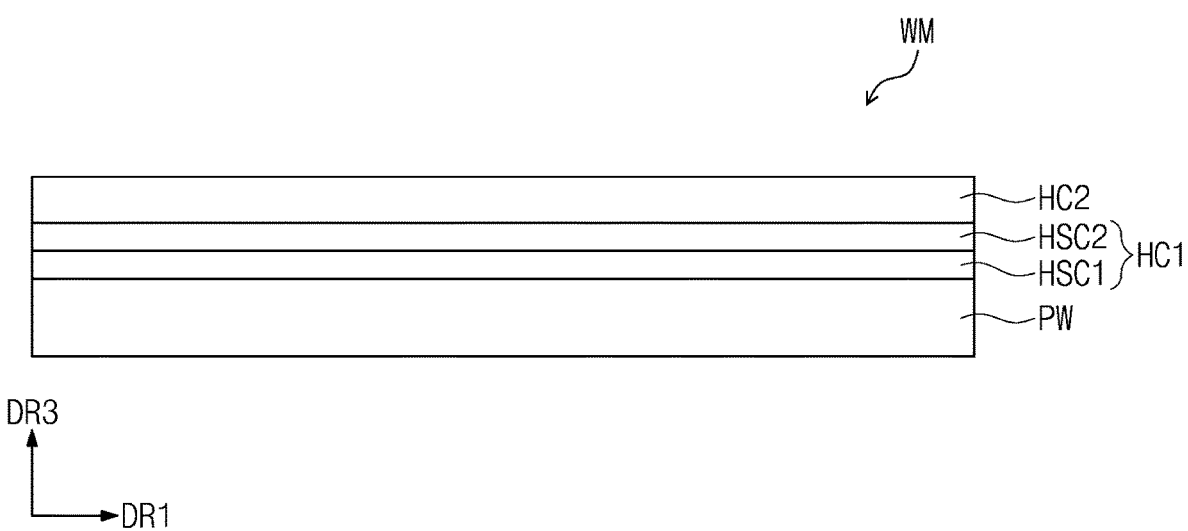
Figure 3C:
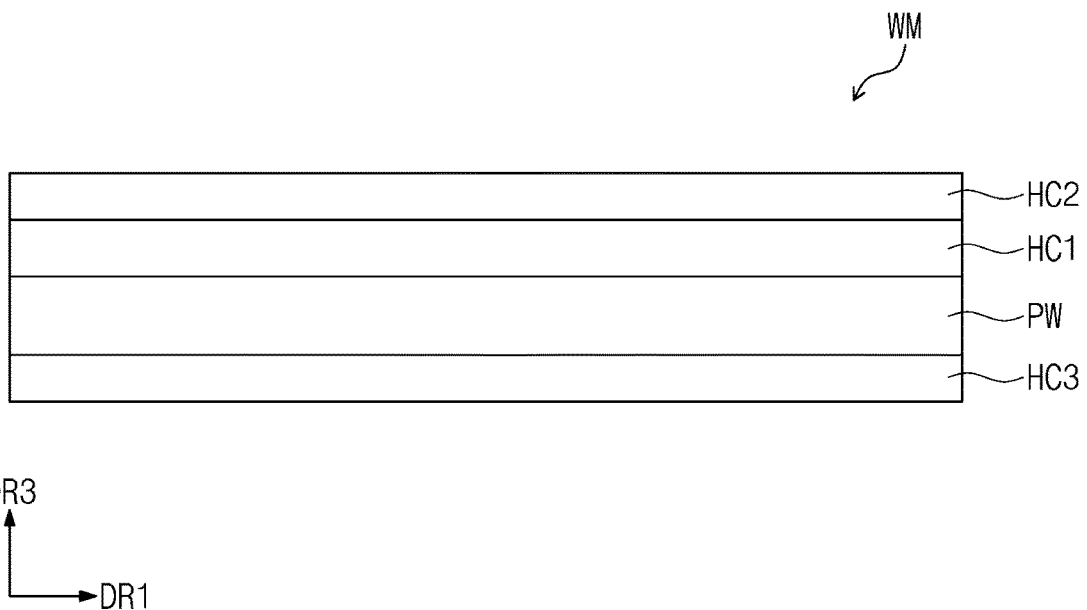
Figure 3D:
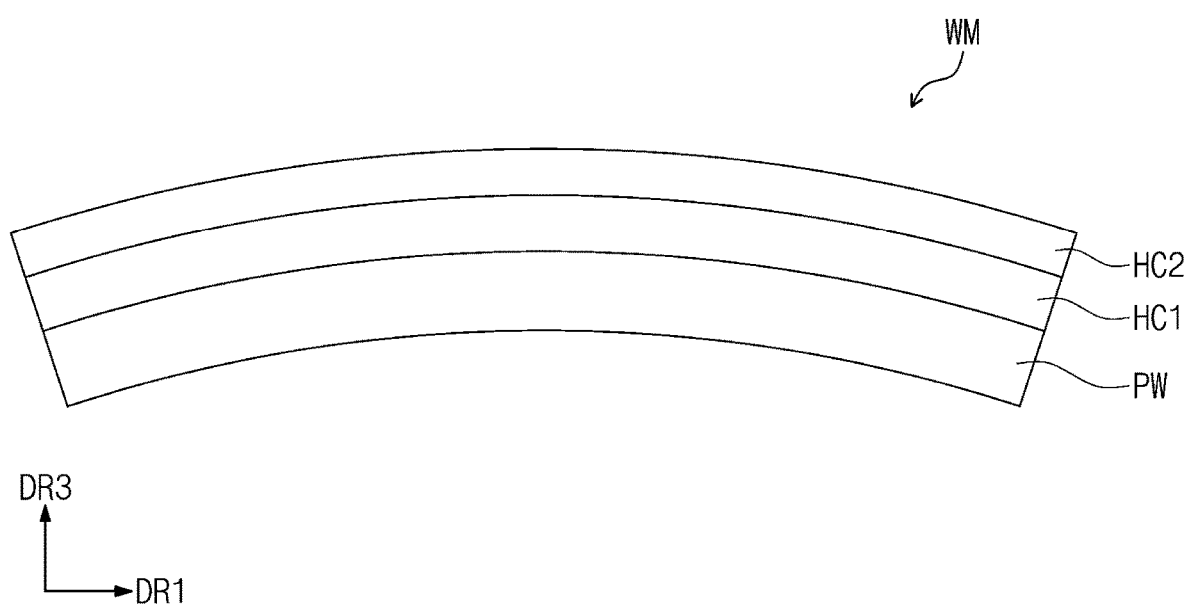
Figure 3E:
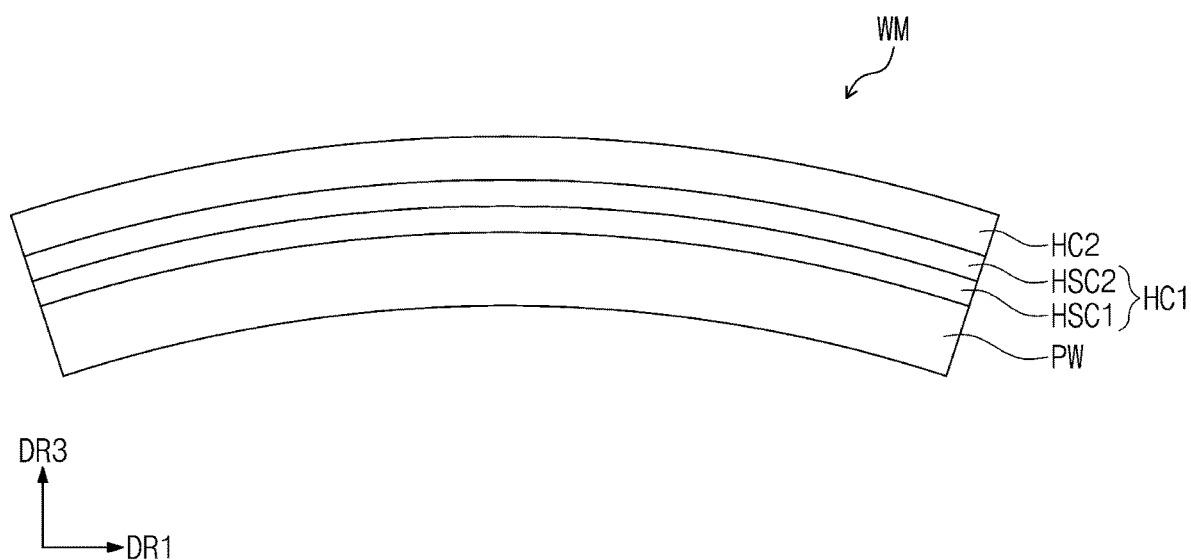
Figure 3F:
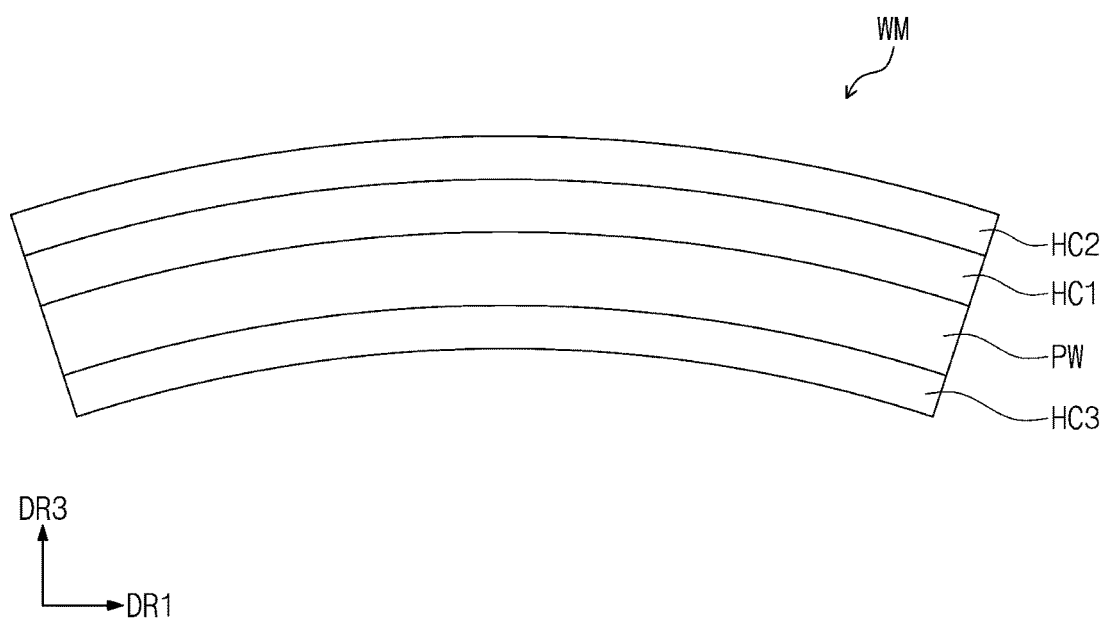

The window member WM may be flat, as illustrated in FIGS. 3A to 3C. Alternatively, the window member WM may be bent, as illustrated in FIGS. 3D to 3F. Referring to FIGS. 3A to 3F, the window member WM includes the plastic window PW, the first hard coating layer HC1, and the second hard coating layer HC2.

The plastic window PW includes plastic. For example, the plastic may include at least one of, but not limited to, polyvinyl chloride, polyethylene, polypropylene, polystyrene, acrylonitrile-butadiene styrene, acrylonitrile styrene, polymethylmethacryl, polyvinyl alcohol, polyvinylidene chloride, polyethyleneterephthalate, polyamide (nylon), polyacetal, polycarbonate, polyphenylene ether, polybutylene terephtalate, polyvinylidene fluoride, polysulfone, polyethersulfone, polyphenylene sulfide, polyarylate, polyamide-imide, polyether imide, polyether ether ketone, polyimide, poly(tetrafluoroethylene), phenolic resins, urea resins, melamine resins, unsaturated polyester resins, epoxy resins, silicon resins, or polyurethane.

The plastic window PW may have a pencil hardness of B to 3H. If the hardness of the plastic window PW is lower than the pencil hardness of B, the plastic window PW may not have durability sufficient to bear an external force due to its low hardness. If the hardness of the plastic window PW is higher than the pencil hardness of 3H, the plastic window PW may not have sufficient flexibility due to its high hardness. Thus, a fracture may easily occur at the plastic window PW when the window member WM receives an external force or is bent.

The first hard coating layer HC1 is provided on the plastic window PW. The first hard coating layer HC1 may include at least one of, but not limited to, polyvinyl chloride, polyethylene, polypropylene, polystyrene, acrylonitrile-butadiene styrene, acrylonitrile styrene, polymethylmethacryl, polyvinyl alcohol, polyvinylidene chloride, polyethyleneterephthalate, polyamide (nylon), polyacetal, polycarbonate, polyphenylene ether, polybutylene terephtalate, polyvinylidene fluoride, polysulfone, polyethersulfone, polyphenylene sulfide, polyarylate, polyamide-imide, polyether imide, polyether ether ketone, polyimide, poly(tetrafluoroethylene), phenolic resins, urea resins, melamine resins, unsaturated polyester resins, epoxy resins, silicon resins, or polyurethane.

A hardness of the first hard coating layer HC1 may have a pencil hardness of 3H to 8H. If the hardness of the first hard coating layer HC1 is lower than the pencil hardness of 3H, the first hard coating layer HC1 may not secure durability bearing an external force due to its low hardness. Thus, the first hard coating layer HC1 may be difficult to protect the plastic window PW. If the hardness of the first hard coating layer HC1 is higher than the pencil hardness of 8H, the first hard coating layer HC1 may not secure flexibility due to its high hardness. Thus, a fracture may easily occur at the first hard coating layer HC1 when the window member WM receives an external force or is bent.

FIGS. 3A, 3B, 3C, 3D, 3E, and 3F are cross-sectional views schematically illustrating examples of a window member included in a display device according to an exemplary embodiment of the inventive concepts.

Referring to FIGS. 3B and 3E, the first hard coating layer HC1 includes a first sub-hard coating layer HSC1 and a second sub-hard coating layer HSC2. The first sub-hard coating layer HSC1 is provided on the plastic window PW. The first sub-hard coating layer HSC1 may include at least one of, but not limited to, polyvinyl chloride, polyethylene, polypropylene, polystyrene, acrylonitrile-butadiene styrene, acrylonitrile styrene, polymethylmethacryl, polyvinyl alcohol, polyvinylidene chloride, polyethyleneterephthalate, polyamide (nylon), polyacetal, polycarbonate, polyphenylene ether, polybutylene terephtalate, polyvinylidene fluoride, polysulfone, polyethersulfone, polyphenylene sulfide, polyarylate, polyamide-imide, polyether imide, polyether ether ketone, polyimide, poly(tetrafluoroethylene), phenolic resins, urea resins, melamine resins, unsaturated polyester resins, epoxy resins, silicon resins, or polyurethane.

The second sub-hard coating layer HSC2 is provided on the first sub-hard coating layer HSC1. The second sub-hard coating layer HSC2 may include at least one of, but not limited to, polyvinyl chloride, polyethylene, polypropylene, polystyrene, acrylonitrile-butadiene styrene, acrylonitrile styrene, polymethylmethacryl, polyvinyl alcohol, polyvinylidene chloride, polyethyleneterephthalate, polyamide (nylon), polyacetal, polycarbonate, polyphenylene ether, polybutylene terephtalate, polyvinylidene fluoride, polysulfone, polyethersulfone, polyphenylene sulfide, polyarylate, polyamide-imide, polyether imide, polyether ether ketone, polyimide, poly(tetrafluoroethylene), phenolic resins, urea resins, melamine resins, unsaturated polyester resins, epoxy resins, silicon resins, or polyurethane.

Each of the first and second sub-hard coating layers HSC1 and HSC2 may be flat, as illustrated in FIG. 3B. Alternatively, each of the first and second sub-hard coating layers HSC1 and HSC2 may be bent, as illustrated in FIG. 3E.

Referring again to FIGS. 3A to 3F, the second hard coating layer HC2 is provided on the first hard coating layer HC1. The second hard coating layer HC2 may include at least one of, but not limited to, polyvinyl chloride, polyethylene, polypropylene, polystyrene, acrylonitrile-butadiene styrene, acrylonitrile styrene, polymethylmethacryl, polyvinyl alcohol, polyvinylidene chloride, polyethyleneterephthalate, polyamide (nylon), polyacetal, polycarbonate, polyphenylene ether, polybutylene terephtalate, polyvinylidene fluoride, polysulfone, polyethersulfone, polyphenylene sulfide, polyarylate, polyamide-imide, polyether imide, polyether ether ketone, polyimide, poly(tetrafluoroethylene), phenolic resins, urea resins, melamine resins, unsaturated polyester resins, epoxy resins, silicon resins, or polyurethane.

The second hard coating layer HC2 may have a surface water contact angle that ranges from 90 degrees to 117 degrees. If the surface water contact angle of the second hard coating layer HC2 is less than 90 degrees, the second hard coating layer HC2 may be difficult to have an anti-fingerprint property. If the surface water contact angle of the second hard coating layer HC2 is greater than 117 degrees, the image shown through the window member WM may be refracted.

The second hard coating layer HC2 may have a pencil hardness of 3H to 9H. If the hardness of the second hard coating layer HC2 is lower than the pencil hardness of 3H, the durability of the second hard coating layer HC2 may not have sufficient durability to bear an external force due to its low hardness. Thus, the second hard coating layer HC2 may fail to sufficiently protect the plastic window PW and the first hard coating layer HC1. If the hardness of the second hard coating layer HC2 is higher than the pencil hardness of 9H, the second hard coating layer HC2 may not be sufficiently flexible due to its high hardness. Thus, a fracture may easily occur at the second hard coating layer HC2 when the window member WM receives an external force or is bent.

The second hard coating layer HC2 may be flat, as illustrated in FIGS. 3A to 3C. Alternatively, the second hard coating layer HC2 may be bent, as illustrated in FIGS. 3D to 3F.

Referring to FIGS. 3C and 3F, a display device 10 according to an exemplary embodiment of the inventive concepts may further include a third hard coating layer HC3. The third hard coating layer HC3 is provided under the plastic window PW. The third hard coating layer HC3 may be provided under the plastic window PW to protect the plastic window PW. The third hard coating layer HC3 may have a significant degree of scratch resistance.

The third hard coating layer HC3 may include at least one of, but not limited to, polyvinyl chloride, polyethylene, polypropylene, polystyrene, acrylonitrile-butadiene styrene, acrylonitrile styrene, polymethylmethacryl, polyvinyl alcohol, polyvinylidene chloride, polyethyleneterephthalate, polyamide (nylon), polyacetal, polycarbonate, polyphenylene ether, polybutylene terephtalate, polyvinylidene fluoride, polysulfone, polyethersulfone, polyphenylene sulfide, polyarylate, polyamide-imide, polyether imide, polyether ether ketone, polyimide, poly(tetrafluoroethylene), phenolic resins, urea resins, melamine resins, unsaturated polyester resins, epoxy resins, silicon resins, or polyurethane.

A hardness of the third hard coating layer HC3 may have a pencil hardness of H to 3H. If the hardness of the third hard coating layer HC3 is lower than the pencil hardness of H, the third hard coating layer HC3 may not secure durability bearing an external force due to its low hardness. Thus, the third hard coating layer HC3 may be difficult to protect the plastic window PW. If the hardness of the third hard coating layer HC3 is higher than the pencil hardness of 3H, the third hard coating layer HC3 may not secure flexibility due to its high hardness. Thus, a fracture may easily occur at the third hard coating layer HC3 when the window member WM receives an external force or is bent.

The third hard coating layer HC3 may be flat, as illustrated in FIG. 3C. Alternatively, the third hard coating layer HC3 may be bent, as illustrated in FIG. 3F.

Figure 4:
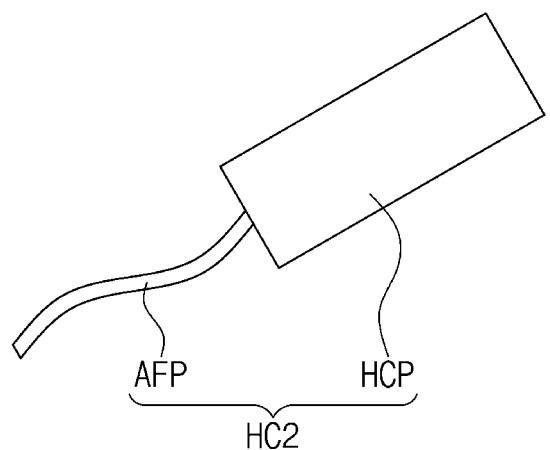
FIG. 4 schematically illustrates a hard coating compound included in a second hard coating layer according to an exemplary embodiment of the inventive concepts.
Figure 5A:
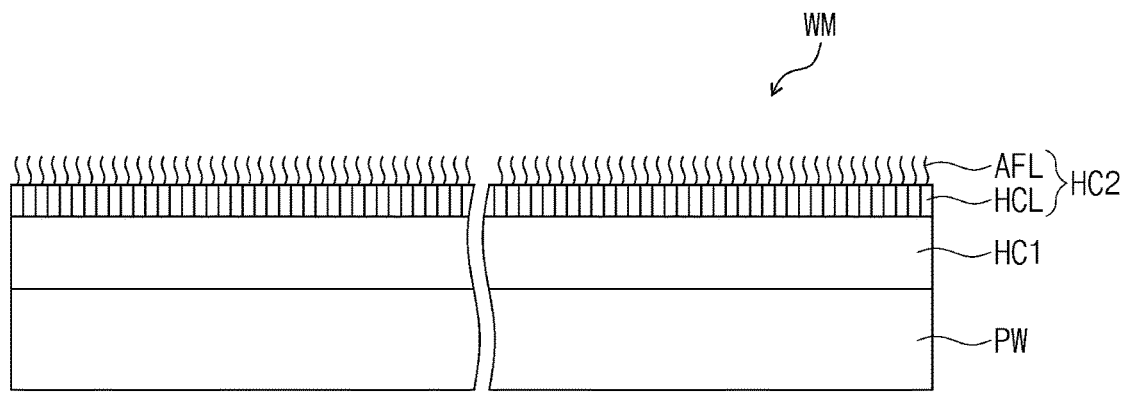
FIG. 5A and FIG. 5B are cross-sectional views schematically illustrating a second hard coating layer formed by disposing a hard coating compound.
Figure 5A:
Figure 5B:
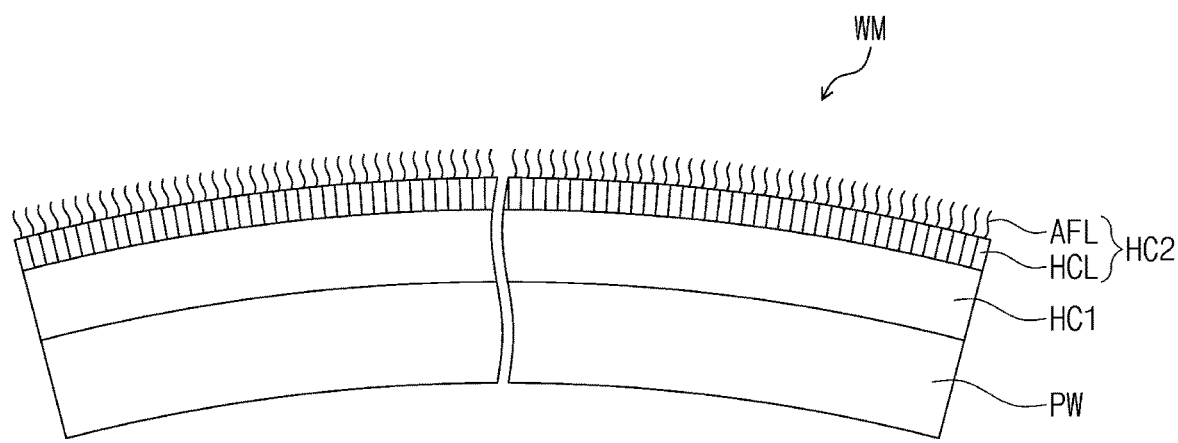
Figure 5B:
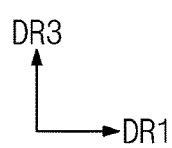

FIG. 4 schematically illustrates a hard coating compound included in a second hard coating layer according to an exemplary embodiment of the inventive concepts. FIGS. 5A and 5B are cross-sectional views schematically illustrating a second hard coating layer formed by disposing a hard coating compound.

Referring to FIGS. 4, 5A, and 5B, the second hard coating layer HC2 may include a hard coating compound HCM. The hard coating compound HCM includes an anti-fingerprint portion AFP and a hard coating portion HCP. The anti-fingerprint portion AFP is disposed at a surface of the second hard coating layer HC2. The anti-fingerprint portion AFP may include fluorine or silicon.

The hard coating portion HCP is connected to the anti-fingerprint portion AFP. A weight of the hard coating portion HCP may be greater than a weight of the anti-fingerprint portion AFP. Thus, when the second hard coating layer HC2 is formed, the hard coating portion HCP may be disposed under the anti-fingerprint portion AFP without requiring an additional process.

The second hard coating layer HC2 includes a hard coating layer HCL and an anti-fingerprint layer AFL. The hard coating layer HCL may maintain the hardness of the second hard coating layer HC2. The hard coating layer HCL is formed of the hard coating portion HCP. The anti-fingerprint layer AFL may be provided at a top of the window member WM to prevent a fingerprint of a user from being shown on the window member WM to the user.

FIGS. 6A, 6B, 6C, 6D, 6E, and 6F are perspective views illustrating various devices using display devices according to an exemplary embodiment of the inventive concepts.

Referring to FIGS. 6A to 6F, the display device 10 according to an exemplary embodiment of the inventive concepts may be applied to various devices. For example, the display device may be selected from a group consisting of a portable phone, a television, a computer, a wearable display device, a rollable display device, a foldable display device, an automotive display device, and a decorative display device.

Figure 6A:
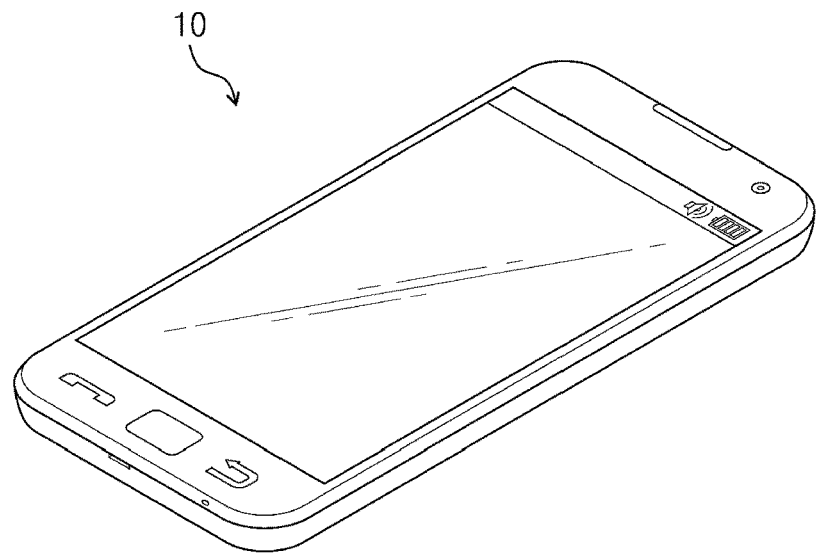
FIG. 6A, FIG. 6B, FIG. 6C, FIG. 6D, FIG. 6E, and FIG. 6F are perspective views illustrating various devices using display devices according to an exemplary embodiment of the inventive concepts.
Figure 6B:
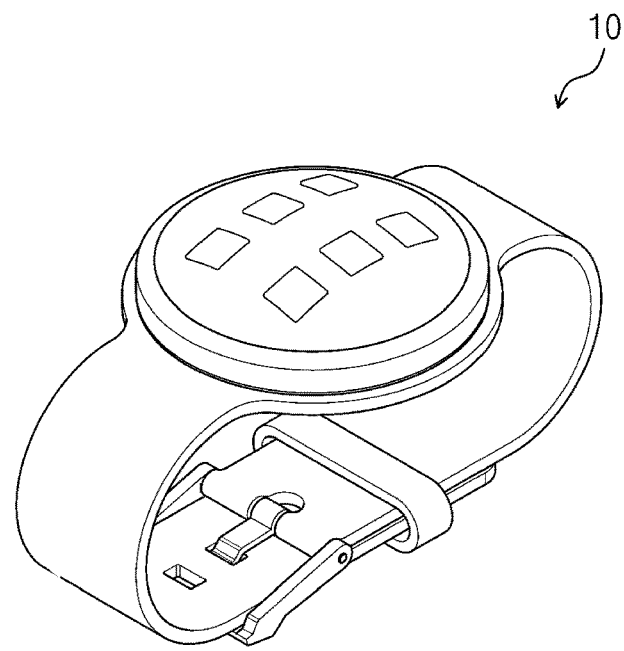

In more detail, FIG. 6A illustrates the portable phone to which the display device according to an exemplary embodiment of the inventive concepts is applied, and FIG. 6B illustrates the wearable display device to which the display device according to an exemplary embodiment of the inventive concepts is applied. The wearable display device is not limited to a specific display device as long as the wearable display device can be worn on a human body. For example, the wearable display device may be a watch, glasses, or a head-up display device.

Figure 6C:
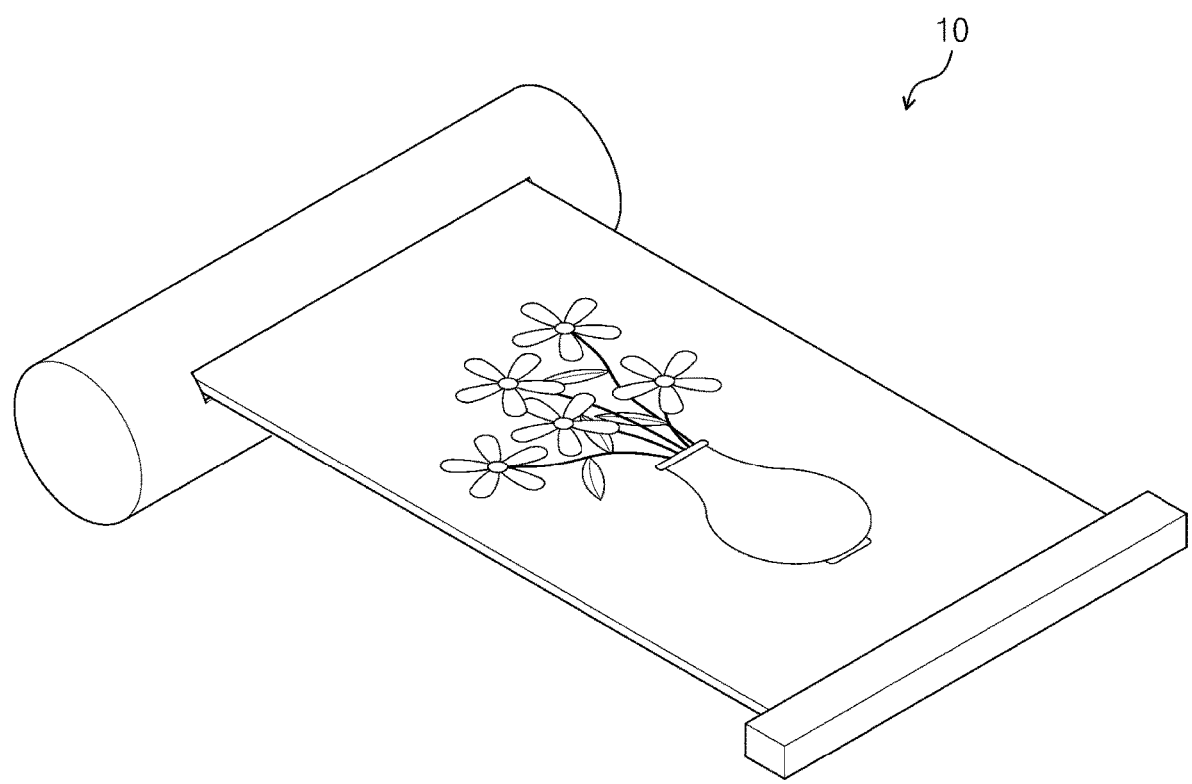
Figure 6D:
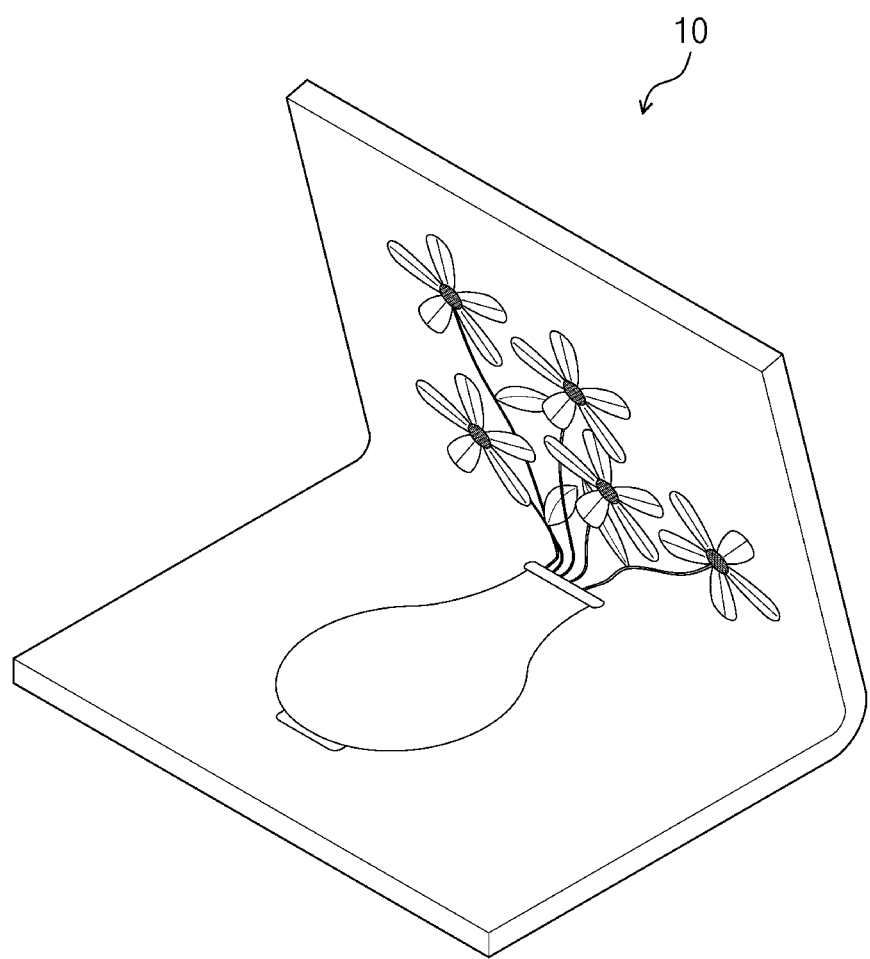

FIG. 6C illustrates the rollable display device to which the display device according to an exemplary embodiment of the inventive concepts is applied. The rollable display device may be a display device in which a display panel can be rolled or unrolled on a rolling axis included in a housing. FIG. 6D illustrates the foldable display device to which the display device according to an exemplary embodiment of the inventive concepts is applied. The foldable display device may be a display device that can be folded or unfolded on one folding axis.

Figure 6E:
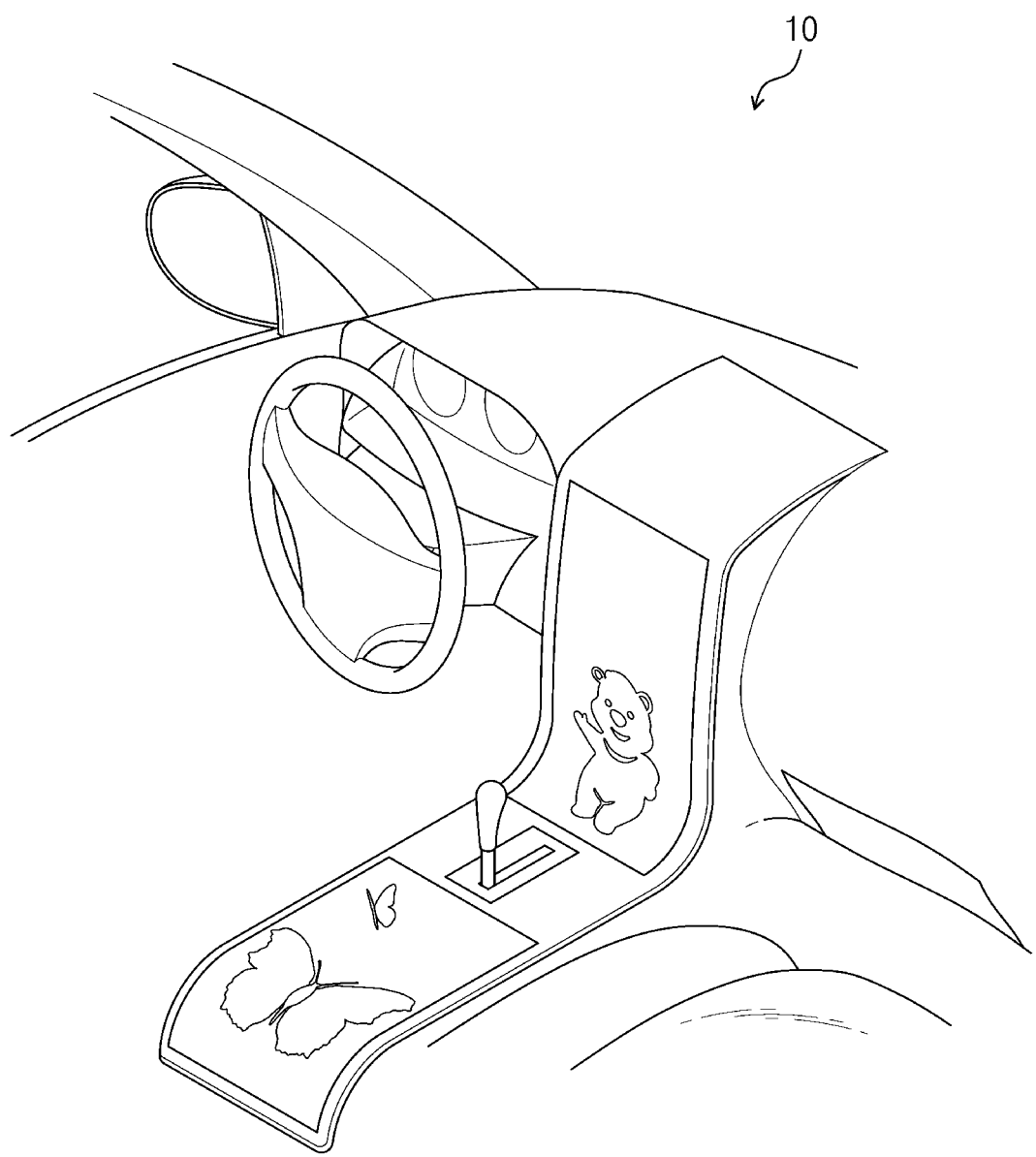

FIG. 6E illustrates the automotive display device to which the display device according to an exemplary embodiment of the inventive concepts is applied. The automotive display device may be a display device located in a transport means, e.g., a display device located in a car, an airplane, or a ship. In an exemplary embodiment, the automotive display device may be a foldable display device or rollable display device located in the transport means.

Figure 6F:
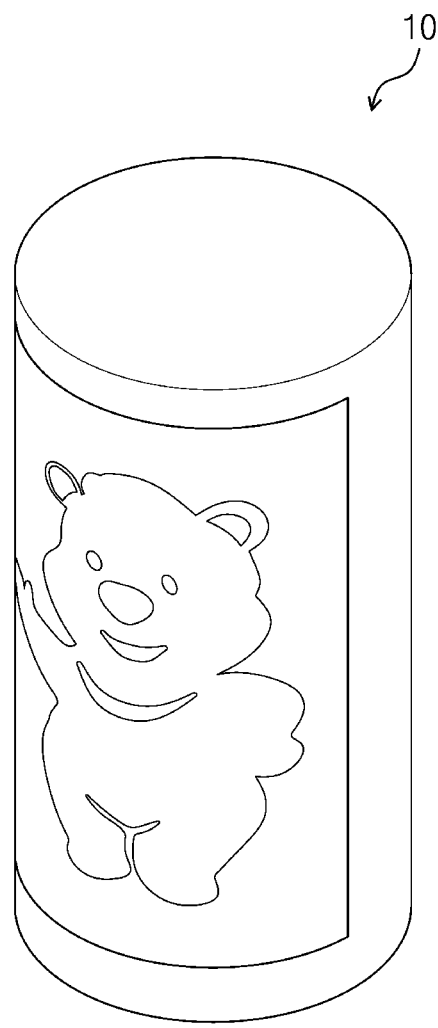

FIG. 6F illustrates the decorative display device to which the display device according to an exemplary embodiment of the inventive concepts is applied. FIG. 6F illustrates a display device disposed on a building structure (e.g., a column) as an example. However, exemplary embodiments of the inventive concepts are not limited thereto.

Generally, a conventional display device includes a window member formed of glass. Thus, a fracture may easily occur at the conventional display device because of its low durability when an external impact is applied to the conventional display device or when the conventional display device is applied to a flexible display device. In addition, even though the conventional display device uses a window member which is formed of plastic instead of glass, durability of the conventional display device with respect to an external impact and/or bending may be low as a result of a low hardness characteristic thereof.

However, the display device according to an exemplary embodiment of the inventive concepts includes the plastic window, the first hard coating layer, and the second hard coating layer, which have a relatively high hardness. Thus, the display device according to an exemplary embodiment of the inventive concepts has a relatively high durability with respect to an external impact and bending. In addition, the second hard coating layer included in the display device according to an exemplary embodiment of the inventive concepts has the hardness and the anti-fingerprint property, which are equal to or higher than specific levels. Thus, it is easy to realize a slim display device. Furthermore, the second hard coating layer of the display device according to the present disclosure may be formed by simple processes.

According to an exemplary embodiment of the inventive concepts, the slim display device may be realized and the durability of the display device may be improved.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device comprising:
a display panel; and
a window member disposed on the display panel, wherein:
the window member comprises:
a plastic window having a pencil hardness of B to 3H;
a first hard coating layer provided on the plastic window;
a second hard coating layer contacting the first hard coating layer; and
a third hard coating layer disposed under the plastic window;
the second hard coating layer comprises a hard coating compound;
a first portion of the hard coating compound constitutes an anti-fingerprint portion and a second portion of the hard coating compound constitutes a hard coating portion;
the hard coating portion is defined between the anti-fingerprint portion and the first hard coating layer;
the hard coating portion is connected to the anti-fingerprint portion;
a surface water contact angle of the second hard coating layer is in a range of 90 degrees to 117 degrees;
the second hard coating layer has a pencil hardness of 4H to 9H;
the pencil hardness of the plastic window is lower than a pencil hardness of the second hard coating layer; and
the third hard coating layer has a pencil hardness greater than H and less than 3H.

2. The display device of claim 1, wherein the first hard coating layer has a pencil hardness of 3H to 8H.

3. The display device of claim 1, wherein the first hard coating layer comprises:
a first sub-hard coating layer; and
a second sub-hard coating layer disposed on the first sub-hard coating layer.

4. The display device of claim 1, wherein a weight of the hard coating portion is greater than a weight of the anti-fingerprint portion.

5. The display device of claim 1, wherein the second hard coating layer comprises:
a hard coating layer; and
an anti-fingerprint layer disposed on the hard coating layer,
wherein:
the hard coating layer is formed of the hard coating portion; and
the anti-fingerprint layer is formed of the anti-fingerprint portion.

6. The display device of claim 1, wherein the window member is flat.

7. The display device of claim 1, wherein the window member is bent.

8. The display device of claim 1, wherein the display device is selected from a group consisting of a portable phone, a television, a computer, a wearable display device, a rollable display device, a foldable display device, an automotive display device, and a decorative display device.

* * * * *